(12) United States Patent
Sarrigeorgidis (10) Patent No.: US 7,944,987 B1
(45) Date of Patent: *May 17, 2011

(54) MIMO EQUALIZER DESIGN: AN ALGORITHMIC PERSPECTIVE

(75) Inventor: Konstantinos Sarrigeorgidis, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/608,926

(22) Filed: Oct. 29, 2009

Related U.S. Application Data (63) Continuation of application No. 10/944,144, filed on Sep. 16, 2004, now Pat. No. 7,616,695.

(60) Provisional application No. 60/581,041, filed on Jun. 17, 2004.

(51) Int. Cl.
*H04B 7/02* (2006.01)

(52) U.S. Cl. ........ 375/267; 375/260; 375/343; 375/349; 375/299

(58) Field of Classification Search .................. 375/267, 375/260, 343, 299, 347, 349
See application file for complete search history.

(56) References Cited

U.S. PATENT DOCUMENTS

| | | | |
|---|---|---|---|
| 5,630,154 | A | 5/1997 | Bolstad et al. |
| 5,852,630 | A | 12/1998 | Langberg et al. |
| 6,600,796 | B1 | 7/2003 | Hassibi |
| 6,760,374 | B1 | 7/2004 | Tapp et al. |
| 7,616,695 | B1 | 11/2009 | Sarrigeorgidis |
| 2002/0021770 | A1 | 2/2002 | Beerel et al. |
| 2003/0003863 | A1 | 1/2003 | Thielecke et al. |
| 2003/0020651 | A1 | 1/2003 | Crilly et al. |
| 2004/0165684 | A1 | 8/2004 | Ketchum et al. |
| 2004/0181419 | A1 | 9/2004 | Davis et al. |
| 2004/0192218 | A1 | 9/2004 | Oprea |
| 2005/0040822 | A1 | 2/2005 | Heaton |
| 2005/0084028 | A1 | 4/2005 | Yu et al. |
| 2005/0141624 | A1 | 6/2005 | Lakshmipathi et al. |
| 2005/0245197 | A1 | 11/2005 | Kadous et al. |
| 2005/0249302 | A1 | 11/2005 | Leshem et al. |
| 2005/0249303 | A1 | 11/2005 | Takano |
| 2005/0276347 | A1 | 12/2005 | Mujtaba et al. |
| 2006/0072692 | A1 | 4/2006 | Gifford et al. |
| 2006/0074290 | A1 | 4/2006 | Chen et al. |
| 2006/0182206 | A1 | 8/2006 | Coon et al. |
| 2006/0227893 | A1 | 10/2006 | Bar-Ness et al. |
| 2007/0253476 | A1 | 11/2007 | Tirkkonen et al. |
| 2007/0258538 | A1 | 11/2007 | Wight |
| 2008/0108310 | A1 | 5/2008 | Tong et al. |
| 2008/0112504 | A1 | 5/2008 | Jiang et al. |
| 2008/0170533 | A1 | 7/2008 | Cyzs et al. |

(Continued)

OTHER PUBLICATIONS

"Part 11: Wireless LAN Medium Access Control (MAC) and Physical Layer (PHY) Specifications," Telecommunications and Information Exchange Between Systems—Local and Metropolitan Area Networks—Specific Requirements, Aug. 20, 1999, IEEE 802.11, ISO/IEC 8802-11, 531 pages.

(Continued)

*Primary Examiner* — Shuwang Liu
*Assistant Examiner* — Kabir A Timory (57) ABSTRACT

Methods and systems for communication include determining multiple angles based on a channel response matrix, calculating a triangular matrix based on the determined angles and the channel response matrix, receiving signals from a transmitter, and estimating transmitted signals using an inverse of the triangular matrix, the determined angles, and the received signals. The determined angles can include one or more angles to perform phase cancellation on the channel response matrix and one or more angles to zero one or more below diagonal elements of the channel response matrix.

15 Claims, 8 Drawing Sheets

U.S. PATENT DOCUMENTS

2008/0285670 A1  11/2008  Walton et al.
2008/0317141 A1  12/2008  Burg et al.

OTHER PUBLICATIONS

"Part 11: Wireless LAN Medium Access Control (MAC) and Physical Layer (PHY) specifications: High-speed Physical Layer in the 5 GHZ Band," Sep. 16, 1999, IEEE 802.11a, Supplement to IEEE Standard for Information Technology—Telecommunications and Information Exchange Between Systems—Local and Metropolitan Area Networks—Specific Requirements, 91 pages.

"Part 11: Wireless LAN Medium Access Control (MAC) and Physical Layer (PHY) Specifications: High-speed Physical Layer Extension in the 2.4 GHz Band," Sep. 16, 1999, IEEE 802.11b, Supplement to IEEE Standard for Information Technology—Telecommunications and Information Exchange Between Systems—Local and Metropolitan Area Networks—Specific Requirements, 96 pages.

"Part 11: Wireless LAN Medium Access Control (MAC) and Physical Layer (PHY) specifications: Further Higher Data Rate Extension in the 2.4 GHz Band," Apr. 2003, IEEE 802.11g/D8.2, DRAFT Supplement to IEEE Standard for Information Technology—Telecommunications and Information Exchange Between Systems—Local and Metropolitan Area Networks—Specific Requirements, 69 pages.

Golub et al., "*Matrix Computations*," 1996, The Johns Hopkins University Press, 3d Ed., Chapter 5, pp. 206-274, 73 pages.

Gesbert, et al., "From Theory to Practice: An Overview of MIMO Space-Time Coded Wireless Systems,", Apr. 2003, *IEEE Journal on Selected Areas in Communications*, vol. 21, No. 3, 23 pages.

"*Wireless LANs—TGn Sync Proposal Technical Specification: Syed Aon Mujtaba*," May 18, 2005, IEEE 802.11n-04/0889r6, 131 pages.

"*Part 16: Air Interface For Fixed Broadband Wireless Access Systems*", Oct. 1, 2004, IEEE 802.16, IEEE Standard for Local and Metropolitan Area Networks, 892 pages.

"*System Requirements for IEEE 802.20 Mobile Broadband Wireless Access Systems—Version 14*," Jul. 16, 2004, IEEE 802.20-PD-06, DRAFT 802.20 Permanent Document, 23 pages.

Golub et al., "Matrix Computations", 1996, The John Hopkins University Press, $3^{rd}$ Edition, Chapter 5, 73 pages.

Sarrigeorgidis, K., "MIMO Equalizer Design: An Algorithmic Perspective", to be published by the USPTO, U.S. Appl. No. 10/944,144, filed Sep. 16, 2004, 34 pages.

Sarrigeorgidis, K., "Scalable Equalizer for Multiple-In-Multiple-Out (MIMO) Wireless Transmission", to be published by the USPTO, U.S. Appl. No. 11/222,490, filed Sep. 7, 2005, 77 pages.

Sarrigeorgidis, K., "Unified Computational Approach For Multi-Mode Multiple-In-Multiple-Out (MIMO) Receivers", to be published by the USPTO, U.S. Appl. No. 11/316,522, filed Dec. 21, 2005, 109 pages.

$$R^{-1}_{4\times 4} = \begin{bmatrix} \dfrac{1}{r_{11}} & \dfrac{-r_{12}}{r_{11}r_{22}} & \dfrac{r_{12}r_{23} - r_{13}r_{22}}{r_{11}r_{22}r_{33}} & \dfrac{r_{12}r_{24}r_{33} - r_{14}r_{22}r_{33} + r_{13}r_{22}r_{34} - r_{12}r_{23}r_{34}}{r_{11}r_{22}r_{33}r_{44}} \\ & \dfrac{1}{r_{22}} & \dfrac{-r_{23}}{r_{22}r_{33}} & \dfrac{r_{23}r_{34} - r_{24}r_{33}}{r_{22}r_{33}r_{44}} \\ & & \dfrac{1}{r_{33}} & \dfrac{-r_{34}}{r_{33}r_{44}} \\ & & & \dfrac{1}{r_{44}} \end{bmatrix}$$

with inner blocks $R^{-1}_{2\times 2}$ and $R^{-1}_{3\times 3}$ indicated.

FIG. 8A $$\begin{bmatrix} x & x & x \\ x & x & x \\ x & x & x \end{bmatrix} \rightarrow \begin{bmatrix} x & 0 & x \\ x & x & x \\ x & x & x \end{bmatrix} \rightarrow \begin{bmatrix} x & 0 & 0 \\ x & x & x \\ x & x & x \end{bmatrix} \rightarrow \begin{bmatrix} x & 0 & 0 \\ x & x & x \\ 0 & x & x \end{bmatrix} \rightarrow \begin{bmatrix} |x| & x & x \\ 0 & x & x \\ 0 & x & x \end{bmatrix} = \begin{bmatrix} |x| & |x|e^{j\phi} \\ 0 & |x| \\ 0 & 0 \end{bmatrix}$$

FIG. 8B $$\begin{bmatrix} e^{-j\phi} & 0 \\ 0 & 1 \end{bmatrix} \begin{bmatrix} |x| & |x|e^{j\phi} \\ 0 & |x| \end{bmatrix} \begin{bmatrix} e^{j\phi} & 0 \\ 0 & 1 \end{bmatrix} = \begin{bmatrix} |x| & |x| \\ 0 & |x| \end{bmatrix} = A$$

FIG. 8C $$\underset{A}{\begin{bmatrix} x & x \\ 0 & x \end{bmatrix}} \rightarrow \underset{Q_1^*A}{\begin{bmatrix} x & \sigma \\ 0 & x \end{bmatrix}} \rightarrow \underset{Q_1^*AQ_2}{\begin{bmatrix} x & \sigma \\ 0 & x \end{bmatrix}} \rightarrow \underset{Q_3^*Q_1^*AQ_2}{\begin{bmatrix} x & 0 \\ \sigma & x \end{bmatrix}} \rightarrow \underset{Q_3^*Q_1^*AQ_2Q_4}{\begin{bmatrix} x & \varepsilon \\ 0 & x \end{bmatrix}} \approx \begin{bmatrix} x & 0 \\ 0 & x \end{bmatrix}$$

MIMO EQUALIZER DESIGN: AN ALGORITHMIC PERSPECTIVE

CROSS-REFERENCE TO RELATED APPLICATIONS

This application is a continuation of and claims priority to U.S. application Ser. No. 10/944,144, filed on Sep. 16, 2004, and entitled "MIMO EQUALIZER DESIGN: AN ALGORITHMIC PERSPECTIVE", which claims priority to U.S. Provisional Application Ser. No. 60/581,041, filed on Jun. 17, 2004 entitled "MIMO EQUALIZER DESIGN: AN ALGORITHMIC PERSPECTIVE".

BACKGROUND

Wireless phones, laptops, PDAs, base stations and other systems may wirelessly transmit and receive data. A single-in-single-out (SISO) system may have two single-antenna transceivers in which one predominantly transmits and the other predominantly receives. The transceivers may use multiple data rates depending on channel quality.

An $M_R \times M_T$ multiple-in-multiple-out (MIMO) wireless system uses multiple transmit antennas ($M_T$) and multiple receive antennas ($M_R$) to improve data rates and link quality. The MIMO system may achieve high data rates by using a transmission signaling scheme called "spatial multiplexing," where a data bit stream is demultiplexed into parallel independent data streams. The independent data streams are sent on different transmit antennas to obtain an increase in data rate according to the number of transmit antennas used. Alternatively, the MIMO system may improve link quality by using a transmission signaling scheme called "transmit diversity," where the same data stream (i.e., same signal) is sent on multiple transmit antennas after appropriate coding. The receiver receives multiple copies of the coded signal and processes the copies to obtain an estimate of the received data.

The number of independent data streams transmitted is referred to as the "multiplexing order" or spatial multiplexing rate ($r_s$). A spatial multiplexing rate of $r_s = 1$ indicates pure diversity and a spatial multiplexing rate of $r_s = \min(M_R, M_T)$ (minimum number of receive or transmit antennas) indicates pure multiplexing.

SUMMARY

A receiver in a wireless system, e.g., a MIMO-OFDM system, may estimate the transmitted signals by estimating a channel response matrix from the received signals and performing a QR decomposition on the channel response matrix. The receiver may utilize Givens rotations to perform the decomposition, which may be performed using coordinate rotation digital computer (CORDIC) modules (e.g., "Super-CORDIC" modules). The results of the QR decomposition may be stored in a memory. A decoder may used the stored results of the decomposition and the received signals to estimate the transmitted signals.

The results of the QR decomposition may include a number of angles encoding a Q matrix and an inverse of an R matrix. The receiver may use the inverse of the R matrix to calculate a signal-to-noise ratio (SNR) of the received signals.

In an embodiment, the Super-CORDIC modules may also be used to perform a singular value decomposition (SVD).

DETAILED DESCRIPTION

Figure 1:
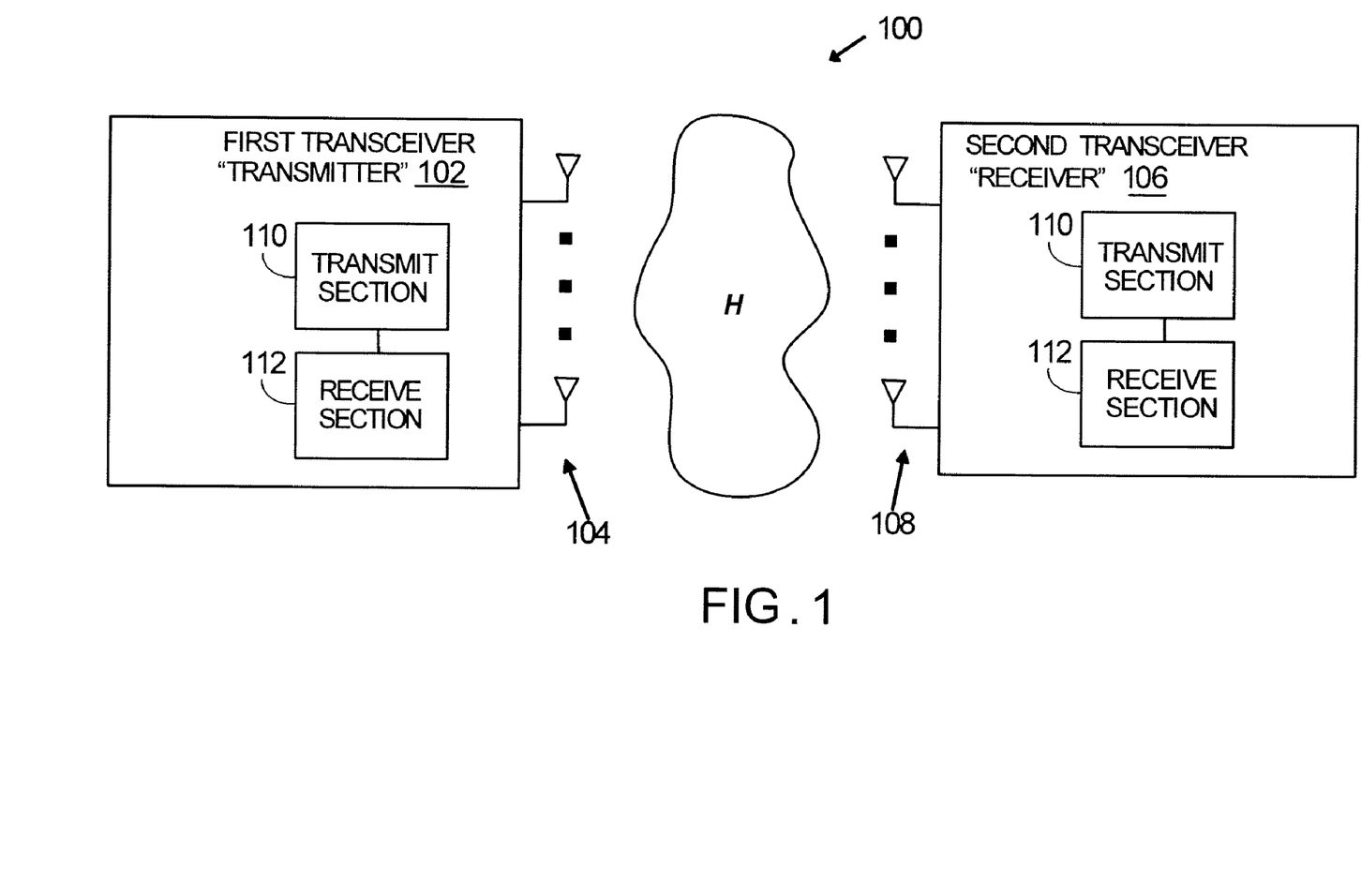
FIG. 1 is a block diagram of a wireless multiple-in-multiple-out (MIMO)-orthogonal frequency-division multiplexing (OFDM) communication system according to an embodiment.

FIG. 1 illustrates a wireless multiple-in-multiple-out (MIMO) communication system 100, which includes a first transceiver 102 with $M_T$ transmit ($T_X$) antennas 104 and a second transceiver 106 with $M_R$ receive (Rx) antennas 108, forming an $M_R \times M_T$ MIMO system. For the description below, the first transceiver 102 is designated as a "transmitter" because the transceiver 102 predominantly transmits signals to the transceiver 106, which predominantly receives signals and is designated as a "receiver". Despite the designations, both "transmitter" 102 and "receiver" 106 may include a transmit section 110 and a receive section 112 and may transmit and receive data.

The transmitter 100 and receiver 102 may be implemented in a wireless local Area Network (WLAN) that complies with the IEEE 802.11 standards (including IEEE 802.11, 802.11a, 802.11b, 802.11g, and 802.11n, 802.16, and 802.20). The IEEE 802.11 standards describe orthogonal frequency-division multiplexing (OFDM) systems and the protocols used by such systems. In an OFDM system, a data stream is split into multiple substreams, each of which is sent over a different subcarrier frequency (also referred to as a "tone"). For example, in IEEE 802.11a systems, OFDM symbols include 64 tones (with 48 active data tones) indexed as $\{-32, -31, \ldots, -1, 0, 1, \ldots, 30, 31\}$, where 0 is the DC tone index. The DC tone is not used to transmit information.

The antennas in the transmitter 102 and receiver 106 communicate over channels in a wireless medium. In FIG. 1, H is the channel response matrix and represents the reflections and multi-paths in the wireless medium, which may affect the quality of the channels. The system may perform channel estimation using known training sequences which are transmitted periodically (e.g., at the start of each frame). A training sequence may include one or more pilot symbols, i.e., OFDM symbols including only pilot information (which is known a priori at the receiver) on the tones. The pilot symbol(s) are inserted in front of each transmitted frame. The receiver 106 uses the known values to estimate the medium characteristics on each of the frequency tones used for data transmission. For example, on the receiver side, the signal $y_i$ for tone i can be written as, $$y_i = H_i x_i + z_i, \qquad (1)$$

where $H_i$ is the channel response for the i-th tone, $x_i$ is the symbol transmitted on the i-th tone, and $z_i$ is the additive noise. The receiver may estimate the transmitted signal $x_i$ for the i-th tone from the received signal $y_i$ and the channel response $H_i$. For an IEEE 802.11a OFDM system, the channel response $H_i$ may be a scalar value provided by the channel estimation module, whereas in an M×N MIMO-OFDM system, the channel response $H_i$ may be an M×N matrix.

The number of independent data streams transmitted by the transmit antennas 104 is called the "multiplexing order" or "spatial multiplexing rate" ($r_S$). A spatial multiplexing rate of $r_S=1$ indicates pure diversity, and a spatial multiplexing rate of $r_S=\min(M_R, M_T)$ (minimum number of receive or transmit antennas) indicates pure multiplexing.

In an embodiment, the MIMO system 100 may use combinations of diversity and spatial multiplexing, e.g., $1 \leq r_s \leq \min(M_R, M_T)$. For example, in a 4×4 MIMO system, the system may select one of four available multiplexing rates ($r_s \in [1, 2, 3, 4]$) depending on the channel conditions. The system may change the spatial multiplexing rate as channel conditions change.

Figure 2:
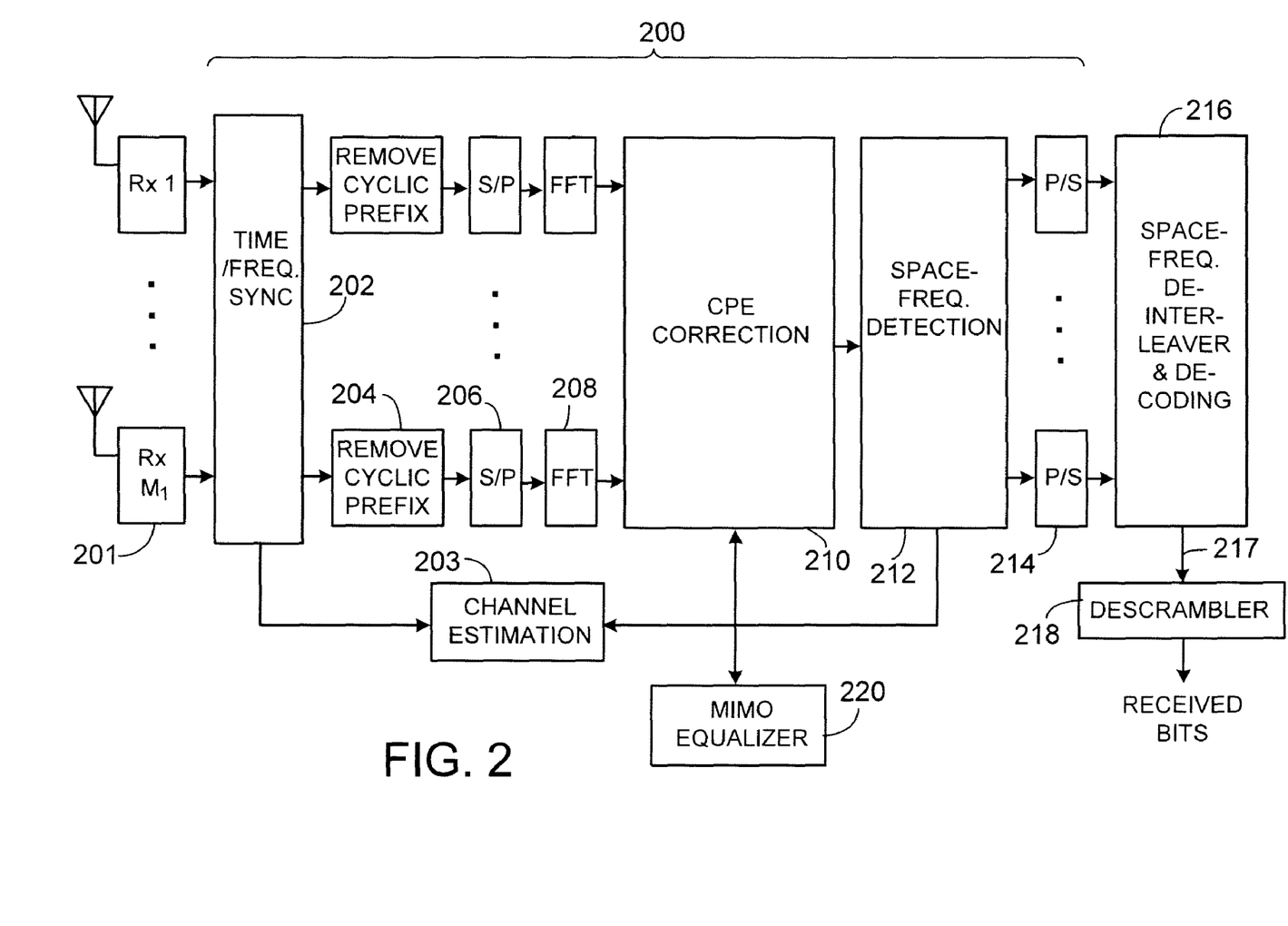
FIG. 2 is a block diagram of a receive section in a transceiver in the MIMO-OFDM communication system.

FIG. 2 shows a block diagram of the receive section 112. The receive section 112 includes stages similar to those in the receive section of an IEEE 802.11a receiver, but with some modifications to account for the multiple receive antennas.

Signals received on the multiple receive antennas are input to corresponding processing chains 200. Each processing chain includes a radio-frequency (RF) module 201 for RF-to-baseband and analog-to-digital (A/D) conversion. The receiver may have a common automatic gain control (AGC) for all antennas to provide minimal gain across all the receive antennas. A time/frequency synchronization module 202 performs synchronization operations and extracts information from the multiple substreams (for $r_S>1$) for channel estimation 203. Each processing chain 200 includes a cyclic prefix removal module 204, a serial-to-parallel (S/P) converter 206, a fast Fourier transform (FFT) module 208, a common phase error (CPE) correction module 210, a space-frequency detection module 212, and a parallel-to-serial (P/S) converter 214. The multiple substreams are input to a space-frequency deinterleaver and decoding module 216 which de-interleaves the substreams into a single data stream and performs soft Viterbi decoding. The single stream is then input to a descrambler 218.

The MIMO-OFDM system may be compatible with IEEE 802.11a systems, and consequently may have many similarities to an IEEE 802.11a system. For example, like IEEE 802.11a systems, the MIMO-OFDM system may use 52 tones (48 data tones and 4 pilot tones), 312.5 kHz subcarrier spacing, an FFT/inverse FFT (IFFT) period of 3.2 µs, a cyclic prefix with a duration of 0.8 µs, and an OFDM symbol duration of 4.0 µs.

Compared to a receiver in an IEEE 802.11a system, which may only have one receive chain, the complexity of most components in the receive chains 200 may scale linearly with the number of antennas. The complexity of the space-frequency detection module 212, however, may not scale linearly because the space-frequency detection module must estimate the signal for each of the forty-eight OFDM subcarriers.

The receiver may use the channel response matrix H to generate a zero-forcing equalizer matrix, $W_{ZF}$, where $$W_{ZF}=(H^* \cdot H)^{-1} \cdot H^* = H^\perp. \tag{2}$$

For each subcarrier, the receiver may "invert" the channel to estimate the transmitted signal $\hat{x}$:

$$\hat{x}=(H^* \cdot H)^{-1} H^* \cdot y = H^\perp \cdot y. \tag{3}$$

The space-frequency detection module may also compute the signal-to-noise ratio (SNR) per substream k:

$$RxSNR_k = \frac{1}{\langle [H^* \cdot H]^{-1} \rangle_{kk}}, \tag{4}$$

and multiply this value by the estimated transmitted signal vector In an embodiment, these computations may be performed using an orthogonal matrix triangularization (or "QR decomposition") of the $M_R \times M_T$, channel response matrix H, such that $$H=Q \cdot R, \tag{5}$$

where Q is an ($M_R$, $M_R$) orthogonal matrix, and R is an ($M_R$, $M_T$) upper triangular matrix. The transmitted QAM (Quadrature Amplitude Modulation) vector can then be computed as:

$$x=R^{-1} \cdot Q^* \cdot y = R^{-1} \cdot z. \tag{6}$$

Figure 3:
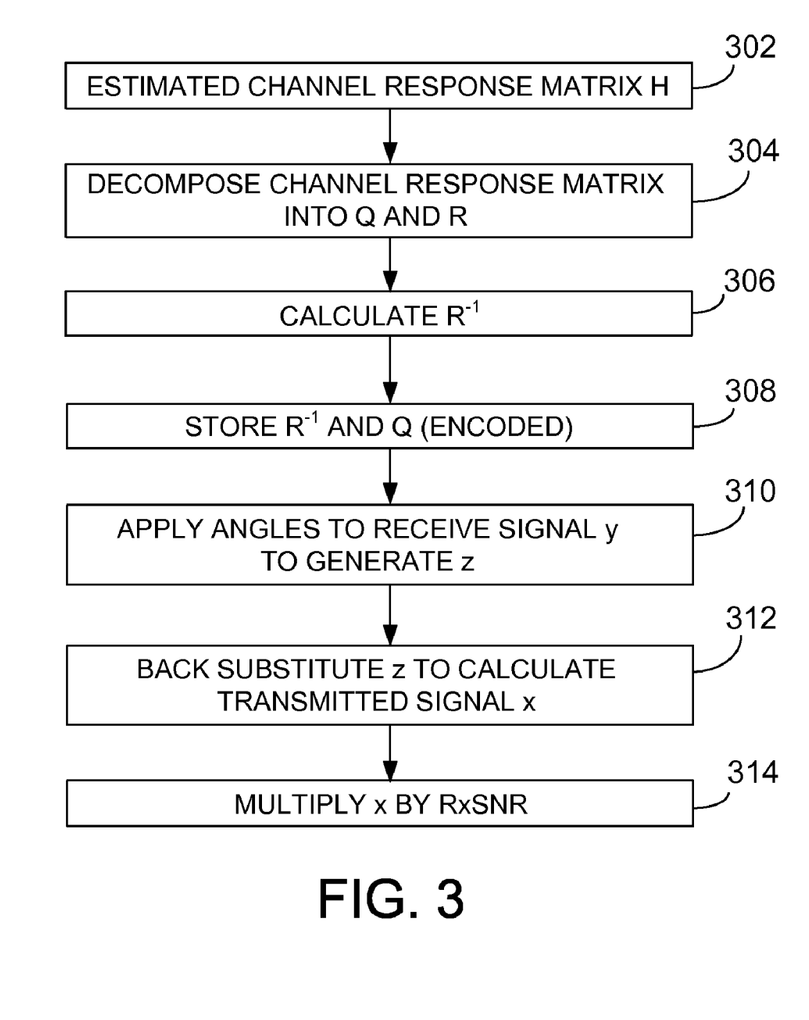
FIG. 3 is a flowchart describing a QR decomposition and decoding operation according to an embodiment.
Figure 4:
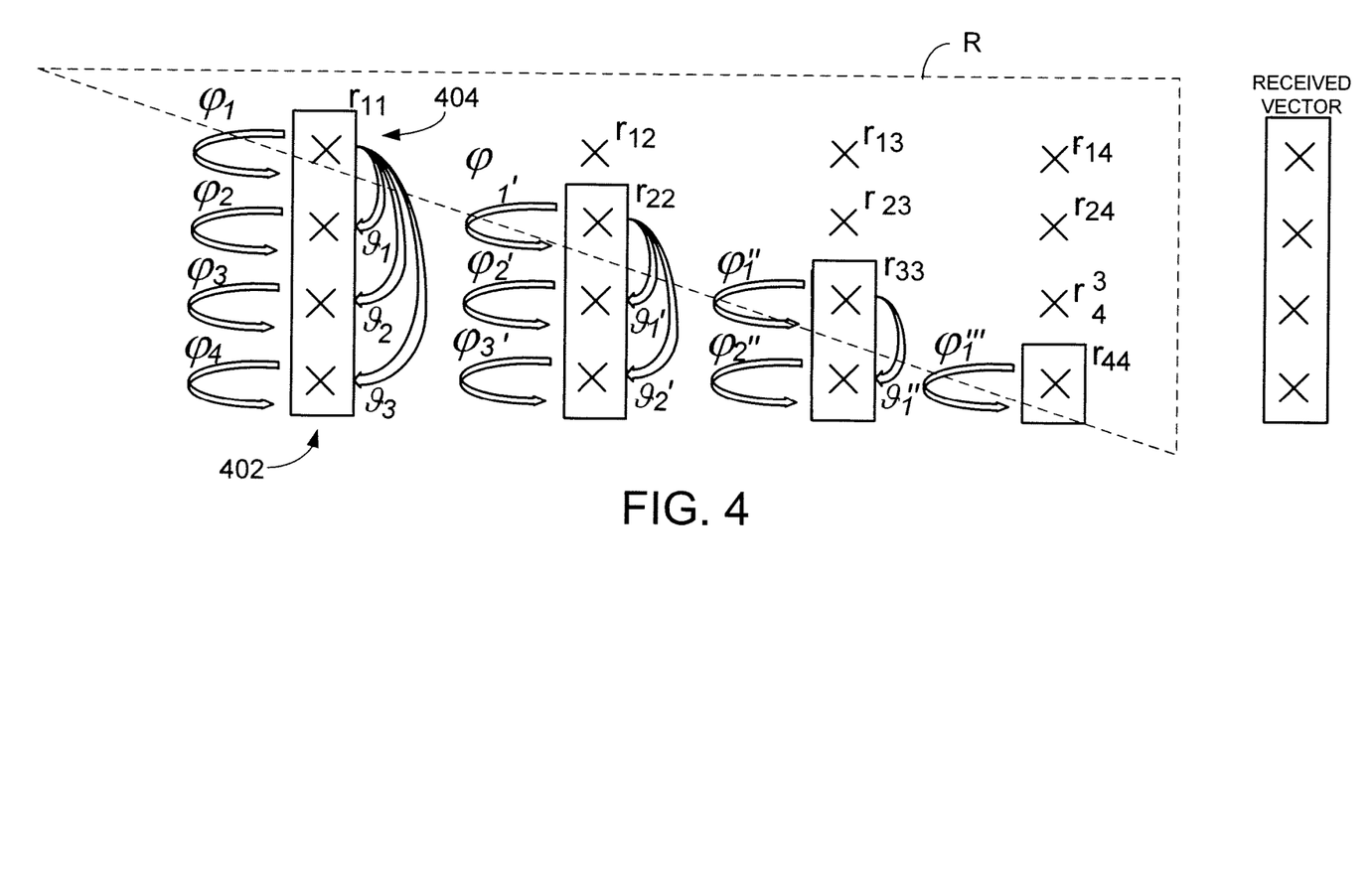
FIG. 4 illustrates Givens rotations operations on a 4×4 channel response matrix.
Figure 5:
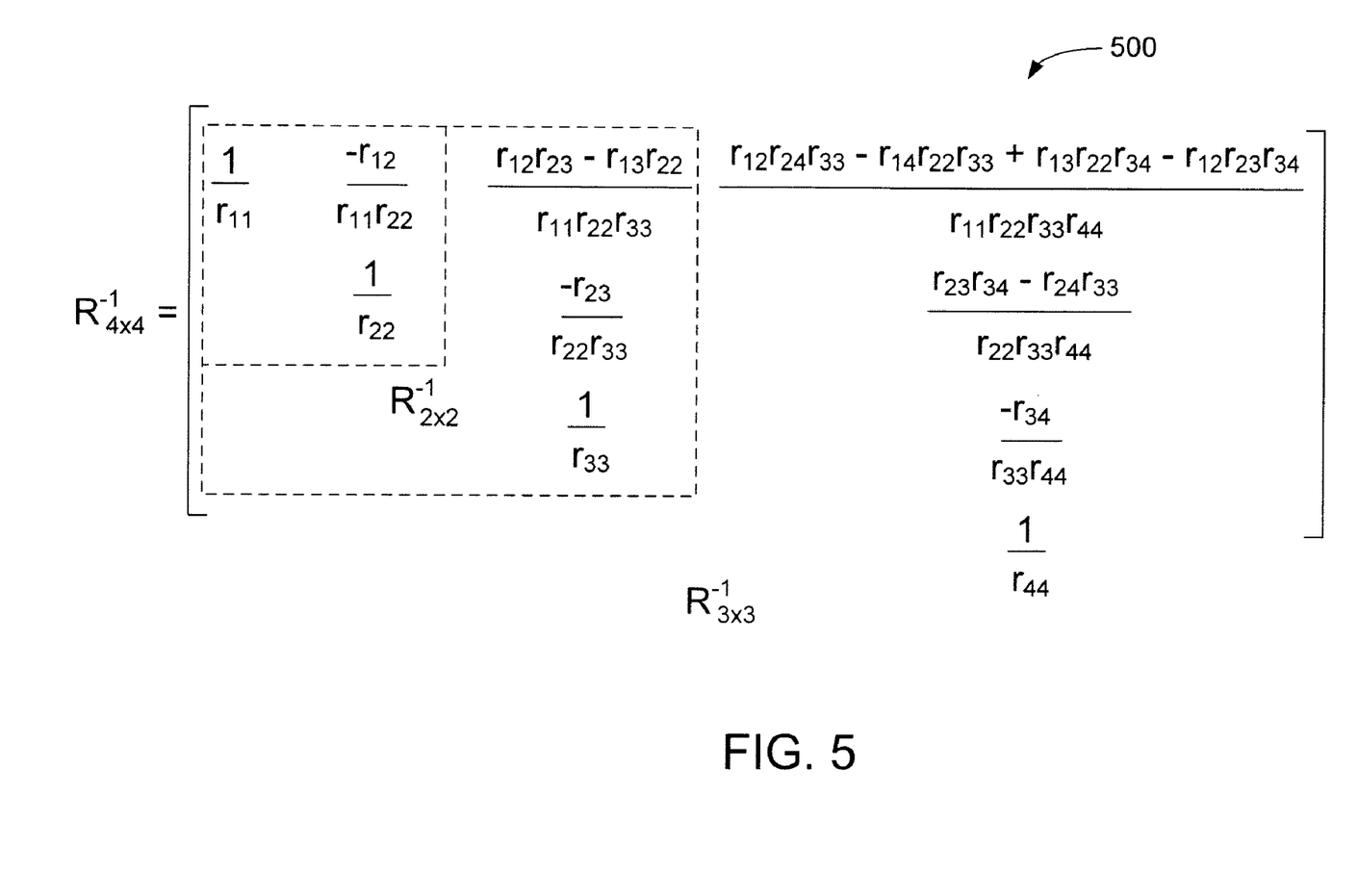
FIG. 5 shows an inverse of upper diagonal matrix R.

FIG. 3 shows a flowchart describing a QR decomposition and decoding process according to an embodiment. The channel estimation module 203 may estimate the channel response matrix H column-by-column during initial preprocessing of a packet using training information in the preamble of the packet (block 302). Givens rotations may be used to clear (zero) elements of the matrix one element at a time to generate the Q and R matrices (block 304). The space-frequency module must perform the QR decomposition column-by-column, as they are received from the channel estimation module 203. Elements in a column may be subject to two rotations, one for phase cancellation and another to zero the elements below the diagonal matrix, as shown in FIG. 4. For example, the complex elements in the first column 402 may be rotated by angles $\phi_1$, $\phi_2$, $\phi_3$, $\phi_4$ to remove the imaginary parts of the vectors (phase cancellation), and then rotated by angles $\theta_1$, $\theta_2$, $\theta_3$ to zero the elements below $r_{11}$ 404 in the upper diagonal matrix R. This process may be repeated for the following columns to phase cancel and zero the elements below $r_{ii}$, resulting in diagonal matrix R. During this initial processing, the inverse matrix $R^{-1}$ 500 may be calculated, as shown in FIG. 5 (block 306). The inverse matrix $R^{-1}$ and the angles encoding Q may be stored (block 308). The channel matrix may be assumed to be constant for the entire packet, and the stored values for Q and $R^{-1}$ may be used for decoding symbols in the packet.

After the initial processing for the packet, symbol decoding may be performed for a received vector y by reading Q and applying rotations to the elements in y to calculate z (block 310), which is given by:

$$z=Q \cdot y. \tag{7}$$

This value may be back-substituted into Equation 5 to estimate the transmitted signal (block 312):

$$\hat{x}=R^{-1} \cdot z. \tag{8}$$

The signal-to-noise ration per transmit stream is given by the reciprocal of the sum of squares of each of the rows of each of the triangular sub-matrices, as shown in FIG. 5. The calculated SNR may be multiplied by the vector $\hat{x}$ (block 314), and it will be fed into the Viterbi block.

In an embodiment, the Givens rotations may be implemented using a CORDIC (COordiate Rotation Digital Computer) approach. CORDIC is an iterative algorithm for calculating trigonometric functions including sine, cosine, magnitude and phase. A CORDIC module rotates the phase of a complex number by multiplying it by a succession of constant values. However, the "multiplies" can all be powers of 2, so in binary arithmetic they can be performed using just shift and add operations, which may make CORDIC particularly suited to hardware implementations.

Figure 6:
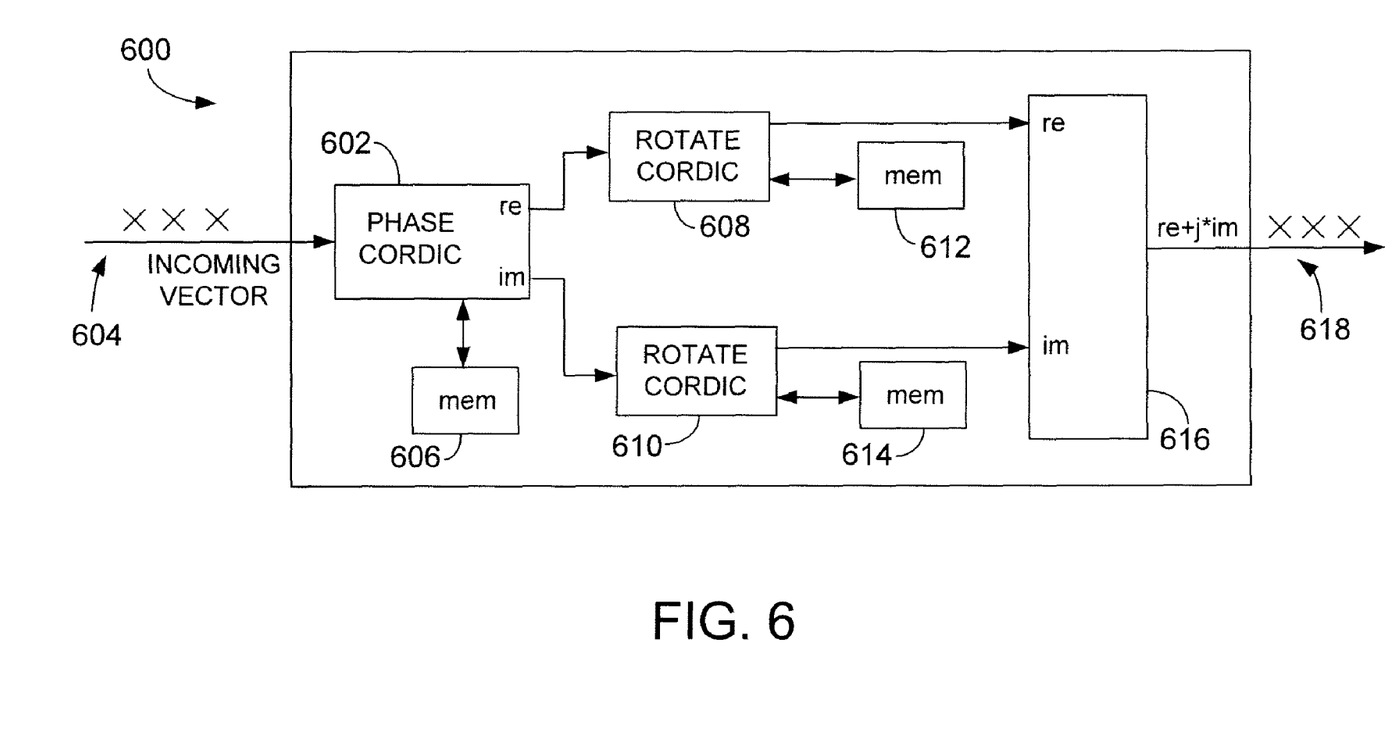
FIG. 6 is a block diagram of a coordinate rotation digital computer (CORDIC) module.

FIG. 6 is a block diagram of a Super-CORDIC module 600, which consists of three CORDIC modules, according to an embodiment. The receiver may include a number of such Super-CORDIC modules, each handling a subset of the subcarrier estimation operations. The CORDIC module 600 may decompose the QR computation into elementary operations. A phase CORDIC 602 may perform a phase canceling operation on an incoming vector 604. The results may be stored in memory 606 and passed to two rotate-CORDICs 608, 610 (for the real and imaginary parts, respectively). The rotate CORDICs may be used to perform the rotations used to zero elements below the upper diagonal matrix. The resulting angles may be stored in memories 612 (real) and 614 (imaginary). These values may be combined in module 616 to generated the transformed vector 618. The values stored in memories 606, 612, and 614 may be used to encode matrix Q and for performing rotations on the received signals (y).

In an embodiment, it may be desirable for the receiver to perform singular value decomposition (SVD) algorithms, e.g., in systems which utilize feedback to optimize energy distribution on the transmit channels. In an embodiment, the Super-CORDIC module may be modified to handle both Givens rotations and SVD calculations. The SVD-CORDIC module may be used to perform both the Givens rotations and SVD operations, thereby conserving resources and chip area.

Figure 7:
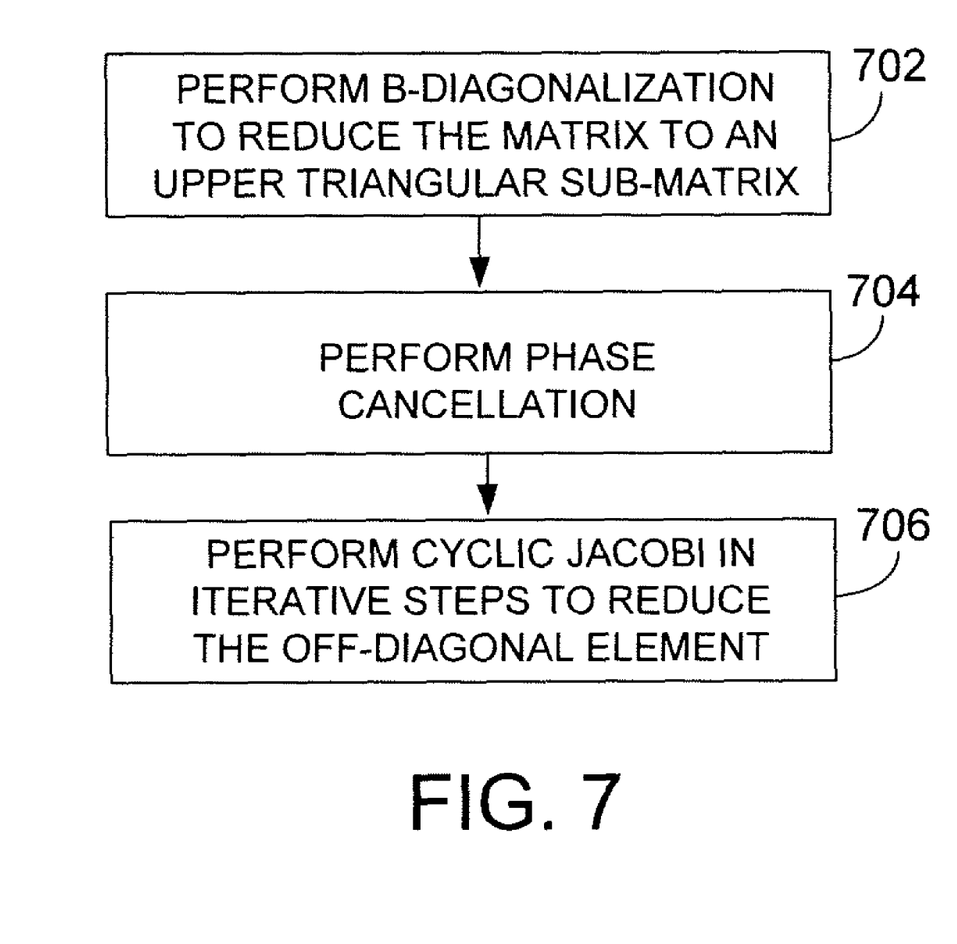
FIG. 7 is a flowchart describing an SVD-CORDIC operation.
Figure 8A:
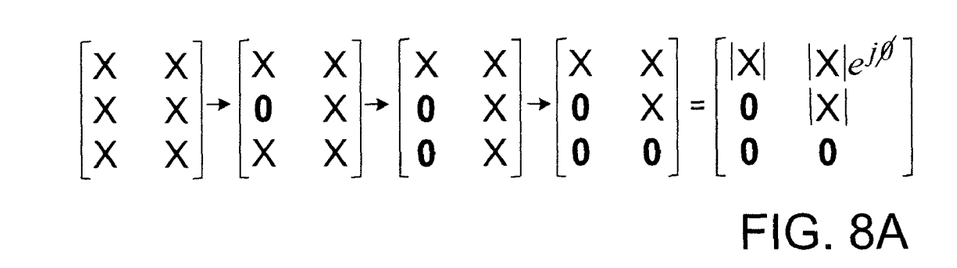
FIGS. 8A-C illustrate steps in an SVD operation.
Figure 8B:
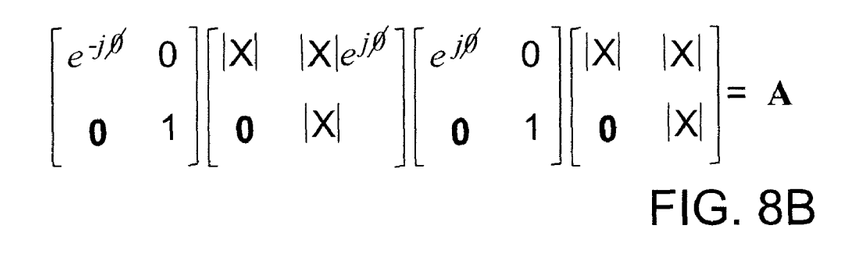
Figure 8C:
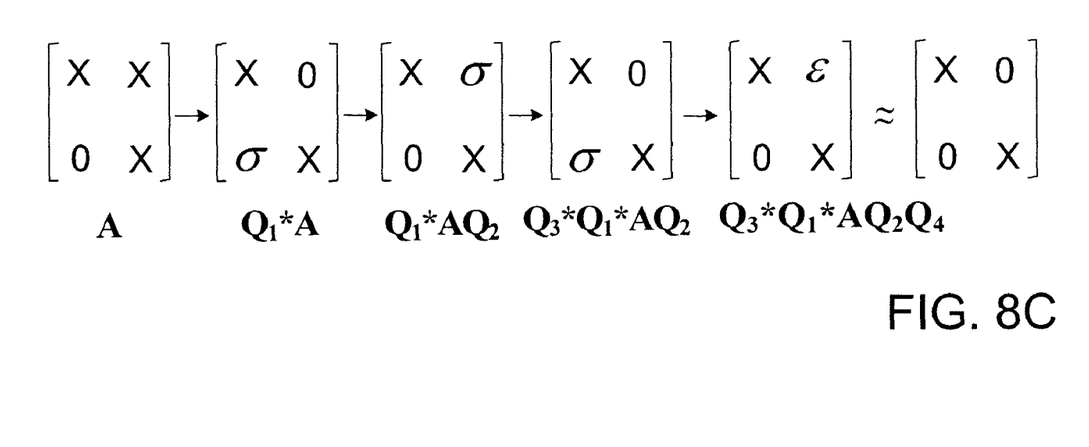

FIG. 7 is a flowchart describing an SVD-CORDIC operation 700. The SVD algorithm may be performed in a manner similar to that used for the Givens rotations. Much of the same CORDIC hardware may be re-used for matrix manipulation in the SVD calculations. FIGS. 8A-C show exemplary steps in an SVD calculation for a 2×3 matrix. First a bi-diagonalization operation may be performed to reduce the matrix to an upper triangular sub-matrix (block 702), as shown in FIG. 8A. To deal with the complex value $e^{j\phi}$, a phase cancellation operation may be performed (block 704), as shown in FIG. 8B. Next a cyclic Jacobi operation may be performed, including several sweeps, in which σ is a small number. A number of iterative steps may be performed to reduce the off-diagonal element until it is very small (ε) (block 706), as shown in FIG. 8C. A number of embodiments have been described.

Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
   determining multiple angles based on a channel response matrix, wherein the determined angles include (i) one or more angles to perform phase cancellation on the channel response matrix and (ii) one or more angles to zero one or more below diagonal elements of the channel response matrix;
   calculating a triangular matrix based on the determined angles and the channel response matrix;
   receiving signals from a transmitter; and
   estimating transmitted signals using (i) an inverse of the triangular matrix, (ii) the determined angles, and (iii) the received signals.

2. The method of claim 1, wherein estimating the transmitted signals comprises:
   using the determined angles to perform rotations on a vector associated with a received signal of the received signals to produce a rotated vector; and
   calculating a transmitted signal based on an application of the inverse of the triangular matrix to the rotated vector.

3. The method of claim 1, wherein estimating the transmitted signals comprises:
   using a coordinate rotation digital computer (CORDIC) module to perform rotations on a vector associated with a received signal of the received signals, wherein the CORDIC module is configured to use the determined angles to perform the rotations.

4. The method of claim 1, wherein determining the multiple angles based on the channel response matrix comprises:
   using a coordinate rotation digital computer (CORDIC) module to effect QR decomposition by performing rotations on at least a portion of the channel response matrix.

5. The method of claim 1, further comprising:
   calculating a signal-to-noise ratio based on the inverse of the triangular matrix; and
   multiplying the signal-to-noise ratio with at least one of the estimated transmitted signals.

6. The method of claim 1, wherein receiving the signals comprises receiving multiple symbols in an orthogonal frequency-division multiplexing (OFDM) packet.

7. The method of claim 6, wherein the channel response matrix is associated with a multiple-in-multiple-out (MIMO) OFDM channel.

8. An apparatus comprising:
   circuitry configured to receive signals from a transmitter;
   circuitry configured to determine multiple angles based on a channel response matrix, wherein the determined angles include (i) one or more angles to perform phase cancellation on the channel response matrix and (ii) one or more angles to zero one or more below diagonal elements of the channel response matrix;
   circuitry configured to calculate a triangular matrix based on the determined angles and the channel response matrix; and
   circuitry configured to estimate transmitted signals using (i) an inverse of the triangular matrix, (ii) the determined angles, and (iii) the received signals.

9. The apparatus of claim 8, further comprises:
   one or more memories configured to store the inverse of the triangular matrix and the plurality of angles.

10. The apparatus of claim 8, wherein the circuitry configured to estimate transmitted signals comprises:
    circuitry configured to use the determined angles to perform rotations on a vector associated with a received signal of the received signals to produce a rotated vector; and
    circuitry configured to calculate a transmitted signal based on an application of the inverse of the triangular matrix to the rotated vector.

11. The apparatus of claim 8, further comprising:
    a coordinate rotation digital computer (CORDIC) module configured to perform rotations on a vector associated with a received signal of the received signals, wherein the CORDIC module is configured to use the determined angles to perform the rotations, wherein the CORDIC module comprises at least a portion of the circuitry configured to estimate transmitted signals.

12. The apparatus of claim 8, further comprising:
    a coordinate rotation digital computer (CORDIC) module that is configured to effect QR decomposition by performing rotations on at least a portion of the channel response matrix, wherein the CORDIC module comprises at least a portion of the circuitry configured to determine multiple angles.

13. The apparatus of claim 8, further comprising:
    circuitry configured to calculate a signal-to-noise ratio based on the inverse of the triangular matrix; and circuitry configured to multiply the signal-to-noise ratio with at least one of the estimated transmitted signal.

14. The apparatus of claim 8, wherein the circuitry configured to receive signals from the transmitter is configured to receive a plurality of symbols in an orthogonal frequency-division multiplexing (OFDM) packet.

15. The apparatus of claim 14, wherein the channel response matrix is associated with a multiple-in-multiple-out (MIMO) OFDM channel.

* * * * *